(12) United States Patent
Imamura

(10) Patent No.: US 10,514,858 B2
(45) Date of Patent: Dec. 24, 2019

(54) INFORMATION PROCESSING APPARATUS, COMPUTER-READABLE RECORDING MEDIUM, AND INFORMATION PROCESSING METHOD

(71) Applicant: FUJITSU LIMITED, Kawasaki-shi, Kanagawa (JP)

(72) Inventor: Satoshi Imamura, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/033,890

(22) Filed: Jul. 12, 2018

(65) Prior Publication Data

US 2019/0065098 A1   Feb. 28, 2019

(30) Foreign Application Priority Data

Aug. 30, 2017   (JP) ................. 2017-165878

(51) Int. Cl.
   *G06F 3/06* (2006.01)
(52) U.S. Cl.
   CPC ............ *G06F 3/0647* (2013.01); *G06F 3/068* (2013.01); *G06F 3/0611* (2013.01); *G06F 3/0659* (2013.01); *G06F 3/0685* (2013.01)
(58) Field of Classification Search
   None
   See application file for complete search history.

(56) References Cited

U.S. PATENT DOCUMENTS

| 2015/0220273 | A1 | 8/2015 | Sun et al. | |
| 2015/0309529 | A1* | 10/2015 | Woo | G06F 11/1666 713/401 |
| 2017/0070574 | A1* | 3/2017 | Sawada | H04L 67/1097 |
| 2018/0004425 | A1* | 1/2018 | Suzuki | G06F 13/10 |

FOREIGN PATENT DOCUMENTS

| JP | 2014-59820 | 4/2014 |
| JP | 6113374 | 4/2017 |
| WO | WO 2017/122332 A1 | 7/2017 |

* cited by examiner

*Primary Examiner* — Ryan Bertram
*Assistant Examiner* — Edmund H Kwong

(57) ABSTRACT

An information processing apparatus includes a DRAM, a nonvolatile memory, and nonvolatile storage. A process execution unit executes, in response to a write instruction, a first writing process of writing write data to the DRAM and storing a write log of the write data in the nonvolatile storage or a second writing process of writing the write data to the nonvolatile memory. A page management unit moves, based on the number of times predetermined data stored in the DRAM or the nonvolatile memory is written or read in a predetermined time period, the processing speed of each of the DRAM and the nonvolatile memory, and the time needed to store the log in the nonvolatile storage executed by the process execution unit, the predetermined data between the DRAM and the nonvolatile memory.

5 Claims, 4 Drawing Sheets

INFORMATION PROCESSING APPARATUS, COMPUTER-READABLE RECORDING MEDIUM, AND INFORMATION PROCESSING METHOD

CROSS-REFERENCE TO RELATED APPLICATION

This application is based upon and claims the benefit of priority of the prior Japanese Patent Application No. 2017-165878, filed on Aug. 30, 2017, the entire contents of which are incorporated herein by reference.

FIELD

The embodiment discussed herein is related to an information processing apparatus, a computer-readable recording medium, and an information processing method.

BACKGROUND

In recent years, because nonvolatile memories equivalent to volatile memories in terms of price and performance have been developed, the use of nonvolatile memories as main storage devices is proposed. Unlike dynamic random access memories (DRAMs) that are generally used as main storage devices, in nonvolatile memories, data is not lost when a power supply is interrupted. Examples of nonvolatile memories used as the main storage devices include phase change memories or the like.

In nonvolatile memories used as main storage devices, a reading speed and a writing speed are high compared with auxiliary storage devices, such as hard disks. Thus, if a nonvolatile memory is used as a main storage device, it is possible to access persistent data at a high speed. In a description below, an auxiliary storage device, such as a hard disk or a solid state drive (SSD), is referred to as "nonvolatile storage".

In contrast, the reading speed of nonvolatile memories is substantially the same as that of DRAMs; however, the writing speed of nonvolatile memories is lower than that of DRAMs. Thus, it is conceivable to construct the main storage device by using a DRAM and a nonvolatile memory such that primary storage data is stored in the DRAM in order to access the data at a high speed and persistent data is stored in the nonvolatile memory in order to access the data at a speed higher than that of the nonvolatile storage. In this case, the nonvolatile storage is used to permanently store large quantities of data.

In this way, because the processing speeds are different between DRAMs and nonvolatile memories, it is preferable to determine which memory, i.e., a DRAM or a nonvolatile memory, is used to store data in accordance with a purpose of use or a use state. By appropriately placing data to a DRAM or a nonvolatile memory, it is possible to improve the performance of an information processing apparatus.

In view of this, as a conventional technology used in a system that includes storage devices each having a different speed, there is a conventional technology of determining which of a resistive random access memory and a flash memory is used to store data in accordance with a writing frequency. Furthermore, there is a conventional technology of determining which of a volatile memory and a nonvolatile memory is used to write data in accordance with a writing frequency.

Patent Document 1: Japanese Laid-open Patent Publication No. 2014-059820

Patent Document 2: Japanese Patent No. 6113374

However, in a case of a process of guaranteeing persistence of data, such as a database, a log that is the history of a data change needs to be recorded to a nonvolatile storage every time the data is written to a DRAM. By recording logs in a nonvolatile storage, data can be restored when the power supply is interrupted. However, a central processing unit (CPU) cycle is consumed by the process of recording the logs and thus performance overhead is generated. In particular, if data that is frequently written is placed in a DRAM, overhead due to the log records is increased, resulting in a decrease in system performance.

Furthermore, if the conventional technology of determining the placement of data in accordance with a writing frequency is used, because the data that is frequently written is simply placed in a high-speed storage device, overhead due to the log records is increased; therefore, it is difficult to improve the system performance.

SUMMARY

According to an aspect of an embodiment, an information processing apparatus includes a first storage device; a second storage device in which the processing speed is lower than that of the first storage device; a third storage device in which the processing speed is lower than that of the second storage device; an execution processor that executes, in response to a write instruction, a first writing process of writing write data to the first storage device and storing a write history of the write data in the third storage device or a second writing process of writing the write data to the second storage device; and a data management processor that moves predetermined data between the first storage device and the second storage device based on the number of times the predetermined data stored in the first storage device or the second storage device is written or read in a predetermined time period, based on the processing speed of each of the first storage device and the second storage device, and based on the time needed to store the write history in the third storage device executed by the execution processor.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Preferred embodiments of the present invention will be explained with reference to accompanying drawings. Furthermore, the information processing apparatus, the information processing program, and the information processing method disclosed in the present invention are not limited to the embodiments described below.

Figure 1:
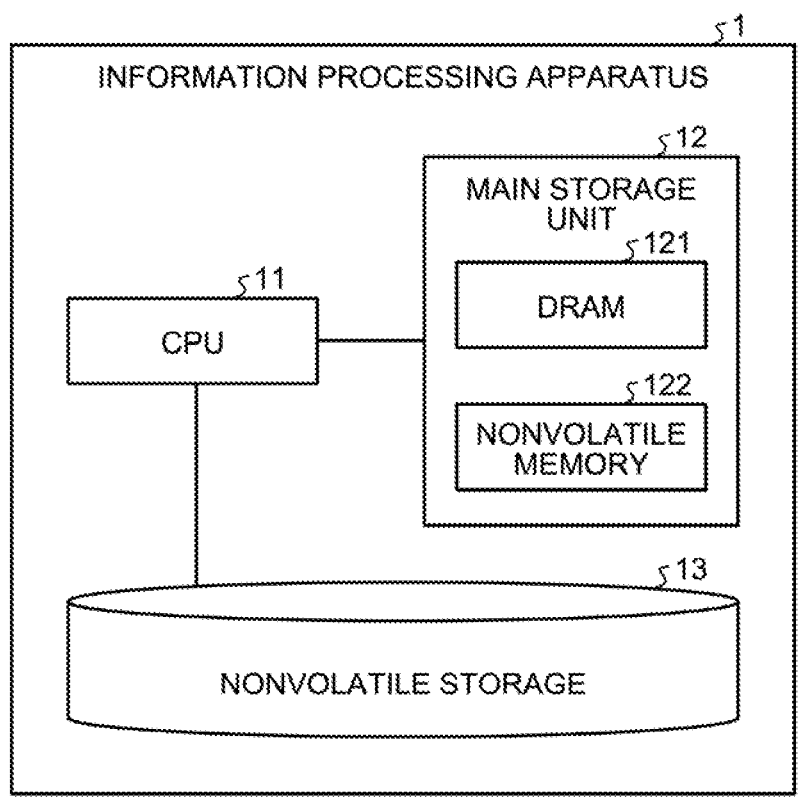
FIG. 1 is a diagram illustrating hardware configuration of an information processing apparatus according to an embodiment.

FIG. 1 is a diagram illustrating hardware configuration of an information processing apparatus according to an embodiment. An information processing apparatus 1 according to the embodiment includes, as illustrated in FIG. 1, a CPU 11, a main storage unit 12, and nonvolatile storage 13.

The CPU 11 is connected to the main storage unit 12 and the nonvolatile storage 13 by a bus. The CPU 11 reads programs that operate an operating system (OS) and various applications from the nonvolatile storage 13 and executes the programs. When executing an application, the CPU 11 accesses the main storage unit 12 in order to read and write data, reads the data from the main storage unit 12, and writes the data to the main storage unit 12.

Here, if a description will be given by using software as the subject of the operation, the application that is allowed by the CPU 11 to be running on the OS stores, in a DRAM 121, temporary data that is temporarily stored in a storage device. Furthermore, the application that is allowed by the CPU 11 to be running on the OS stores, in a nonvolatile memory 122 or the nonvolatile storage 13, persistent data that is requested to be retained even if a supply of the power supply is stopped.

In a description below, a case in which the CPU 11 operates an application that guarantees the durability of data will be described. An application that guarantees the durability of data may be, for example, a database, or the like.

Because a database is requested to guarantee the durability of data, at the time of executing a program of the database, if the CPU 11 writes data to the DRAM 121, the CPU 11 records a log that is a write history of the data in the nonvolatile storage 13. Here, the log is information recorded by associating, for example, information on data obtained by compressing updated data when the data is written and updated or information indicating the content of the update, such as a difference between data that is before and after the update, with the data written to the DRAM 121.

Namely, when the CPU 11 stores, in the DRAM 121, data that is used for a database, the CPU 11 generates log record overhead that is used to record a log. In the log record overhead, the time needed to create a log, such as calculating a difference, and the time needed to store a log in the nonvolatile storage. In order to reduce the log record overhead, the CPU 11 may also write the log of each of the pieces of data to the nonvolatile storage 13 when writing of predetermined pieces of data has been ended.

In contrast, because the durability of data is guaranteed in the nonvolatile memory 122, at the time of executing a program of the database, when the CPU 11 writes data to the nonvolatile memory 122, the CPU 11 can omit the process of recording a log.

Furthermore, based on whether to shorten the time to read and write the data, the CPU 11 periodically determines whether each of the pieces of data stored in the DRAM 121 and the nonvolatile memory 122 is to be moved by determining whether to shorten the time needed to read and write the data due to the movement of each of the pieces of data. Then, the CPU 11 moves, between the DRAM 121 and the nonvolatile memory 122, the data that is determined to be moved. The movement of data will be described in detail later.

The main storage unit 12 includes the DRAM 121 and the nonvolatile memory 122. The DRAM 121 is a volatile memory in which data is lost when a supply of the power supply is stopped. The nonvolatile memory 122 retains data even if a supply of the power supply is stopped. The processing speed of the DRAM 121 is higher than that of the nonvolatile memory 122. Furthermore, the processing speed of the nonvolatile memory 122 is higher than that of the nonvolatile storage 13. Furthermore, the size of the nonvolatile memory 122 is sufficiently greater than that of the DRAM 121. For example, the size of the nonvolatile memory 122 is about five times greater than the size of the DRAM 121. The DRAM 121 corresponds to an example of a "first storage unit". Furthermore, the nonvolatile memory 122 corresponds to an example of a "second storage unit".

The nonvolatile storage 13 is a mass and nonvolatile storage device. The nonvolatile storage 13 is, for example, a hard disk, an SSD, or the like. The nonvolatile storage 13 stores therein various programs, such as an OS and applications. The processing speed of the nonvolatile storage 13 is much lower than that of the DRAM 121 and the nonvolatile memory 122. The nonvolatile storage 13 corresponds to an example of a "third storage unit".

Figure 2:
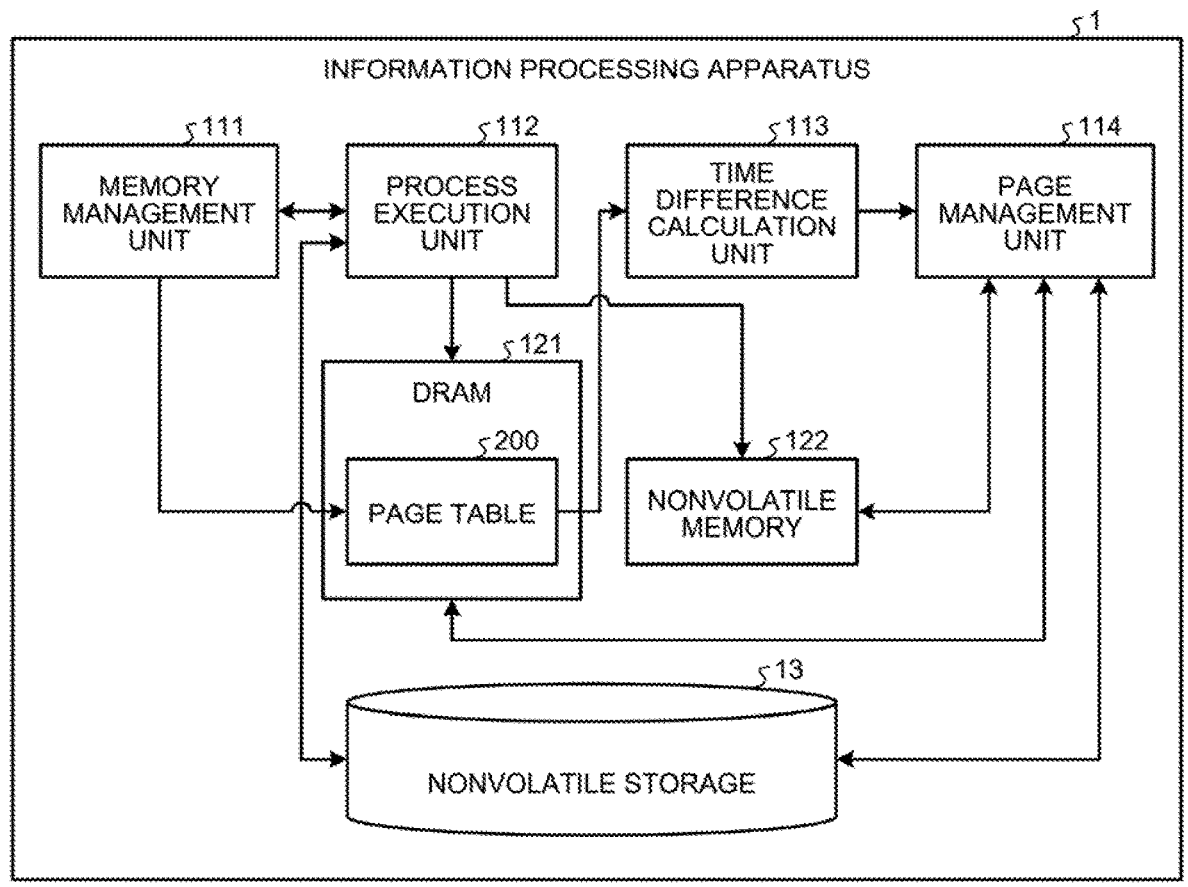
FIG. 2 is a block diagram illustrating the information processing apparatus according to the embodiment.

In the following, a movement of data between the DRAM 121 and the nonvolatile memory 122 will be described with reference to FIG. 2. FIG. 2 is a block diagram illustrating the information processing apparatus according to the embodiment.

The information processing apparatus 1 includes a memory management unit 111, a process execution unit 112, a time difference calculation unit 113, and a page management unit 114. The memory management unit 111, the process execution unit 112, the time difference calculation unit 113, and the page management unit 114 are implemented by the CPU 11. Specifically, various programs including the programs that implement the memory management unit 111, the process execution unit 112, the time difference calculation unit 113, and the page management unit 114 are stored in the nonvolatile storage 13. Then, the CPU 11 reads various programs from the nonvolatile storage 13 and executes the programs. Consequently, the CPU 11 implements the function of the memory management unit 111, the process execution unit 112, the time difference calculation unit 113, and the page management unit 114.

The process execution unit 112 executes an application of a database and acquires a read instruction and a write instruction. In a description below, if the read instruction and the write instruction are not distinguished, the instructions are sometimes simply referred to as a "processing instruction". The processing instruction is issued per page that is a unit of pieces of data managed by the OS. The size of the page depends on the OS and is, for example, 4 kB. In a description below, pieces of data per page is sometimes simply referred to as a "page".

The process execution unit 112 outputs a processing instruction to the memory management unit 111. Then, the process execution unit 112 acquires a physical address associated with a virtual address that is designated by the processing instruction from the memory management unit 111.

Then, in a case of a write instruction given to existing data, the process execution unit 112 updates the data that is indicated by the acquired physical address and that is stored in the DRAM 121, the nonvolatile memory 122, or the nonvolatile storage 13 by overwriting the data designated by the write instruction. Furthermore, when the process execution unit 112 writes data to the DRAM 121, the process execution unit 112 records a write log of the executed data into the nonvolatile storage 13. In contrast, in a case of a write instruction given to new data, the process execution unit 112 writes data at the storage position of the DRAM 121 designated by the acquired physical address. In this case, the process execution unit 112 also records a write log of the executed data into the nonvolatile storage 13. The process execution unit 112 corresponds to an example of an "execution unit". Furthermore, the process of writing data to the DRAM 121 and writing a log to the nonvolatile storage 13 corresponds to an example of a "first writing process". Furthermore, a process of writing data to the nonvolatile memory 122 corresponds to an example of a "second writing process".

Furthermore, in a case of a read instruction given to data, the process execution unit 112 reads data that is indicated by the acquired physical address and that is stored in the DRAM 121, the nonvolatile memory 122, or the nonvolatile storage 13.

Figure 3:
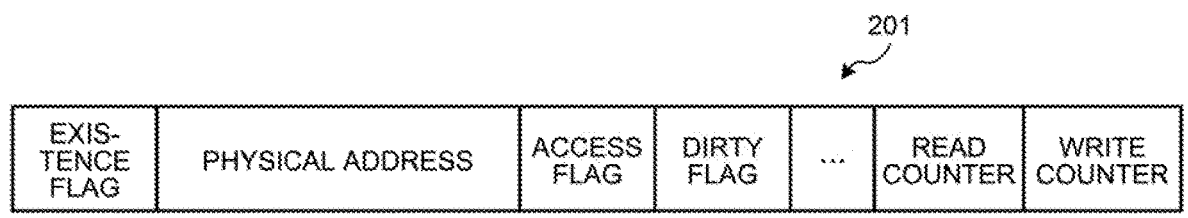
FIG. 3 is a diagram illustrating an example of a page table entry.

The memory management unit 111 creates a page table 200 and stores the page table 200 in the DRAM 121. The page table 200 includes a page table entry 201 that stores therein various kinds of information on a single page illustrated in FIG. 3. FIG. 3 is a diagram illustrating an example of a page table entry.

The page table entry 201 includes, for example, an existence flag, a physical address, an access flag, a dirty flag, a read counter, and a write counter. The existence flag is information indicating whether a page is present in the main storage unit 12. The physical address is an address indicating a physical location in which a page associated with the page table entry 201 is stored. The access flag is information indicating whether the page associated with the page table entry 201 has been accessed. The dirty flag is information indicating whether writing has been performed on the page associated with the page table entry 201. The read counter is a counter representing the number of times the page associated with the page table entry 201 has been read. The write counter is a counter representing the number of times the writing has been performed on the page associated with the page table entry 201. The page table entry 201 is registered by using a virtual address as the index.

The memory management unit 111 receives an input of the processing instruction from the process execution unit 112. Then, the memory management unit 111 acquires the virtual address designated by the processing instruction. Then, the memory management unit 111 searches the page table 200 by using the acquired virtual address and specifies the page table entry 201 that is associated with the subject virtual address. Then, the memory management unit 111 sets the access flag of the specified page table entry 201.

Then, the memory management unit 111 determines whether the processing instruction is a write instruction or a read instruction. If the processing instruction is a write instruction, the memory management unit 111 sets a dirty flag of the specified page table entry 201. Furthermore, the memory management unit 111 increments the write counter of the specified page table entry 201 by one. In contrast, if the processing instruction is a read instruction, the memory management unit 111 increments the read counter of the specified page table entry 201 by one.

Then, the memory management unit 111 acquires the physical address from the specified page table entry 201. Then, the memory management unit 111 outputs the acquired physical address to the process execution unit 112.

The time difference calculation unit 113 previously has information on the reading speed of the DRAM 121 and the reading speed of the nonvolatile memory 122. Furthermore, the time difference calculation unit 113 previously has information on the band width of the DRAM 121 and the band width of the nonvolatile memory 122. Furthermore, the time difference calculation unit 113 previously has information on the cache line size that is a unit of data treated at a single reading or writing from or to the DRAM 121 and the nonvolatile memory 122. Furthermore, the time difference calculation unit 113 retains the time needed to record a log of past execution into the nonvolatile storage 13. Then, the time difference calculation unit 113 performs a statistical process by using the retained information and obtains the time needed when the data was written to the DRAM 121 one time in order to record the log performed on the nonvolatile storage 13. Then, the time difference calculation unit 113 stores the obtained value as the coefficient that is used to calculate the log record overhead.

The time difference calculation unit 113 acquires, for each previously determined predetermined time period, the value of the write counter and the value of the read counter in each of the page table entries 201 in the page table 200. The value of the write counter and the value of the read counter correspond to the number of times reading and writing performed on each page in the predetermined time period. Here, the time difference calculation unit 113 sets the predetermined time period to, for example, 1 second. Then, the time difference calculation unit 113 returns the counter value to zero. Here, in the embodiment, the counter value is returned to zero; however, the time difference calculation unit 113 may also acquire the number of times reading and writing performed in the predetermined time by storing the counter value accumulated last time and subtracting the accumulated counter value from the read counter value.

Then, by using Numerical Expression 1 below, the time difference calculation unit 113 obtains a reading/writing processing time difference of the time between a case in which writing and reading each of the pages in the predetermined time is performed in the DRAM 121 and a case in which the same process is performed in the nonvolatile memory 122.

[Numerical Expression 1]

(nonvolatile memory reading speed-DRAM reading speed×#reads+cache line size(#reads+#writes)/ (band width of DRAM-band width of nonvolatile memory)  (1)

In Numerical Expression 1, "# reads" represents the number of times reading of a page was performed in the predetermined time period. Furthermore, "# writes" represents the number of times writing of a page was performed in the predetermined time period. Here, the processing speed of each of the DRAM 121 and the nonvolatile memory 122 affects the processing time mainly when a page is read. Thus, in the first term in Numerical Expression 1, a difference between the processing time of the DRAM 121 and the nonvolatile memory 122 using a reading speed is calculated.

Then, the time difference calculation unit 113 obtains the log record overhead in the predetermined time in a case where each of the pieces of data is arranged in the DRAM 121 by using Numerical Expression 2 below.

[Numerical Expression 2]

$K \times \#writes$  (2)

where K represents the coefficient used to calculate the log record overhead.

Then, the time difference calculation unit 113 subtract the log record overhead from the reading/writing processing time difference between each of the pages and calculates a time difference of the overall time related to the processing instruction executed in the predetermined time between a case in which each of the pages is arranged in the DRAM 121 and a case in which each of the pages is arranged in the nonvolatile memory 122. Then, the time difference calculation unit 113 outputs the calculated time difference of each of the pages to the page management unit 114.

The page management unit 114 receives, from the time difference calculation unit 113, an input of the time difference of the overall time related to the processing instruction executed in the predetermined time between the case in which each of the pages is arranged in the DRAM 121 and the case in which each of the pages is arranged in the nonvolatile memory 122. Then, the page management unit 114 creates a DRAM list by arranging the identification information on each of the pages arranged in the DRAM 121 in descending order of time differences. For example, the page management unit 114 can use virtual addresses as the identification information. Furthermore, the page management unit 114 creates a nonvolatile memory list by arranging the identification information on each of the pages arranged in the nonvolatile memory 122 in descending order of time differences.

In a description below, the page associated with the identification information described at the top of the DRAM list is referred to as the top page of the DRAM list. Namely, the top page of the DRAM list mentioned here is the page in which the time difference is the largest from among the pages stored in the DRAM 121. Furthermore, the page associated with the identification information described at the end of the DRAM list is referred to as the last page of the DRAM list. Namely, the last page of the DRAM list mentioned here is the page in which the time difference is the smallest from among the pages stored in the DRAM 121. Similarly, the page associated with the identification information described at the top of the nonvolatile memory list is referred to as the top page of the nonvolatile memory list. Namely, the top page of the nonvolatile memory list mentioned here is the page in which the time difference is the largest from among the pages stored in the nonvolatile memory 122. Furthermore, the page associated with the identification information described in the end of the nonvolatile memory list is referred to as the last page of the nonvolatile memory list. Namely, the last page of the nonvolatile memory list mentioned here is the page in which the time difference is the smallest from among the pages stored in the nonvolatile memory 122.

In the following, the page management unit 114 determines whether the time difference of the page described at the end of the DRAM list is equal to or greater than zero. If the time difference of the page described at the end of the DRAM list is equal to or less than zero, the page management unit 114 moves the page described at the end of the DRAM list from the DRAM 121 to the nonvolatile memory 122. Then, the page management unit 114 moves the identification information on the page described at the end of the DRAM list to the end of the nonvolatile memory list. The page management unit 114 repeats the move process of moving the last page of the DRAM list until the time difference of the last page of the DRAM list becomes greater than zero.

In contrast, if the time difference of the last page of the DRAM list is greater than zero, the page management unit 114 determines whether the number of pages registered in the DRAM list is less than the maximum number of pages that can be arranged in the DRAM 121.

If the number of pages registered in the DRAM list is less than the maximum number of pages that can be arranged in the DRAM 121, the page management unit 114 determines whether the time difference of the top page of the nonvolatile memory list is greater than zero. If the time difference of the top page of the nonvolatile memory list is greater than zero, the page management unit 114 moves the top page of the nonvolatile memory list from the nonvolatile memory 122 to the DRAM 121. Then, the page management unit 114 moves the identification information described at the top of the nonvolatile memory list to the top of the DRAM list. The page management unit 114 repeats the move process of moving the page described at the top of the nonvolatile memory list until the number of pages registered in the DRAM list is less than the maximum number of pages that can be arranged in the DRAM 121 or until the time difference of the top page of the nonvolatile memory list becomes equal to or less than zero.

In contrast, if the time difference of the top page of the nonvolatile memory list is equal to or less than zero, the page management unit 114 ends the page move process.

In contrast, if the number of pages registered in the DRAM list reaches the maximum number of pages that can be arranged in the DRAM 121, the page management unit 114 determines whether the time difference of the last page of the DRAM list is less than the time difference of the top page of the nonvolatile memory list.

If the time difference of the last page of the DRAM list is less than the time difference of the top page of the nonvolatile memory list, the page management unit 114 swaps the last page of the DRAM list stored in the DRAM 121 with the top page of the nonvolatile memory list stored in the nonvolatile memory 122. Then, the page management unit 114 moves the identification information described at the top of the nonvolatile memory list to the top of the DRAM list. Then, the page management unit 114 moves the identification information described at the end of the DRAM list to the end of the nonvolatile memory list.

The page management unit 114 repeats the process of swapping the pages in the DRAM 121 and the nonvolatile memory 122 until the time difference of the last page of the DRAM list becomes equal to or greater than the time difference of the top page of the nonvolatile memory list. Because the size of the nonvolatile memory 122 is greater than that of the DRAM 121, in the case where no free space is present in the DRAM 121, the page management unit 114 creates free space in the DRAM 121 by moving the page stored in the DRAM 121 to the nonvolatile memory 122.

In contrast, if the time difference of the last page of the DRAM list is equal to or greater than time difference of the top page of the nonvolatile memory list, the page management unit 114 ends the page move process. The page management unit 114 corresponds to the example of a "data management unit".

Figure 4:
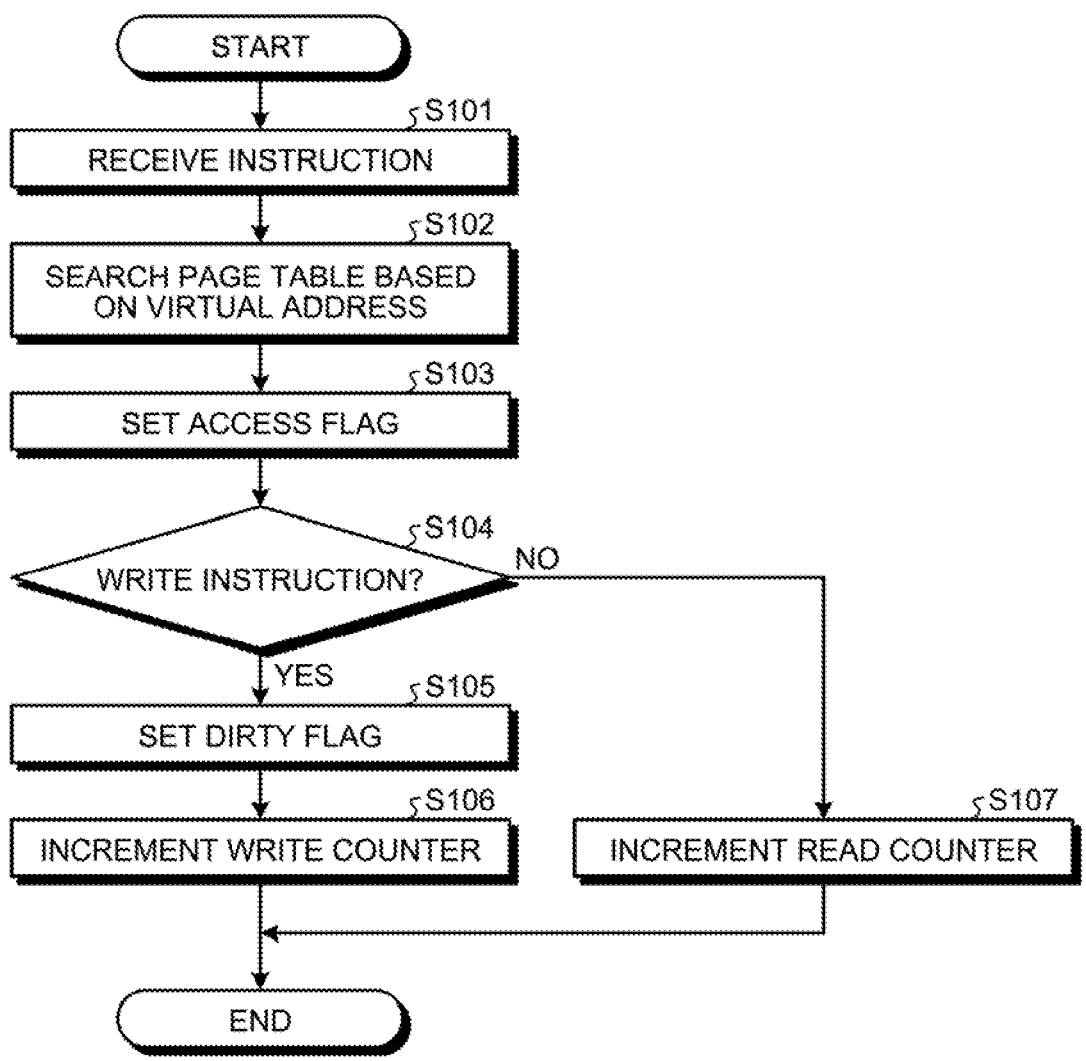
FIG. 4 is a flowchart of the flow of a registration process performed on a page table.

In the following, the flow of a registration process performed on the page table 200 by the memory management unit 111 when a processing instruction is received will be described with reference to FIG. 4. FIG. 4 is a flowchart of the flow of the registration process performed on a page table.

The memory management unit 111 receives a write instruction or a read instruction from the process execution unit 112 (Step S101).

Then, the memory management unit 111 acquires the virtual address designated by the received processing instruction. Then, the memory management unit 111 searches the page table 200 based on the acquired virtual address (Step S102). Then, the memory management unit 111 specifies the page table entry 201 associated with the virtual address.

Then, the memory management unit 111 sets the access flag of the specified page table entry 201 (Step S103).

Then, the memory management unit 111 determines whether the received processing instruction is a write instruction (Step S104).

If the received processing instruction is a write instruction (Yes at Step S104), the memory management unit 111 sets a dirty flag of the specified page table entry 201 (Step S105).

Furthermore, the memory management unit 111 increments the write counter of the specified page table entry 201 by one (Step S106).

In contrast, if the received processing instruction is not the write instruction (No at Step S104), i.e., if the received processing instruction is a read instruction, the memory management unit 111 increments the read counter of the specified page table entry 201 by one (Step S107). Then, the memory management unit 111 acquires the physical address from the specified page table entry 201 and outputs the acquired physical address to the process execution unit 112.

Figure 5:
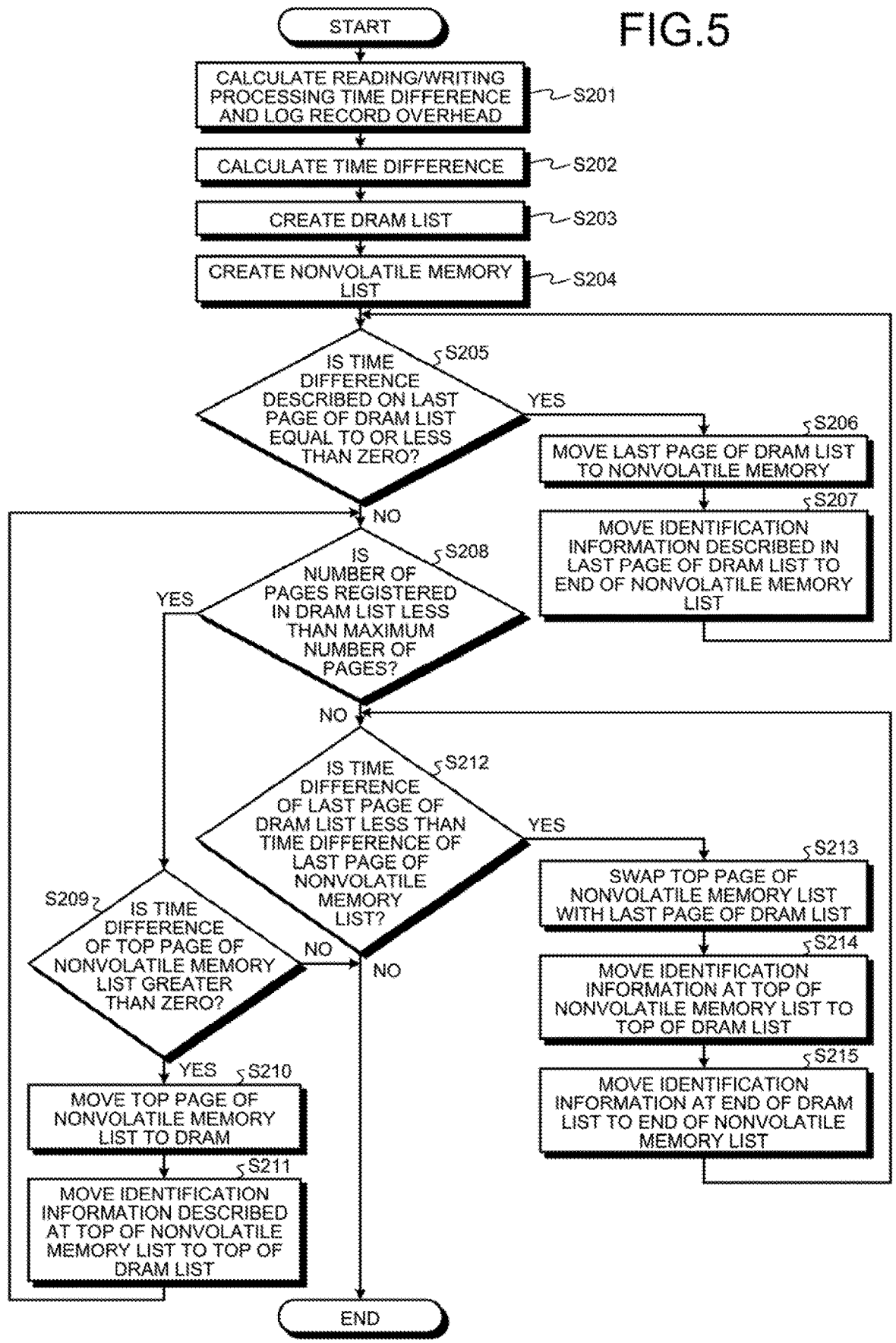
FIG. 5 is a flowchart of the flow of a page move process.

In the following, the flow of a page move process performed by the time difference calculation unit 113 and the page management unit 114 will be described with reference to FIG. 5. FIG. 5 is a flowchart of the flow of the page move process.

The time difference calculation unit 113 acquires, for each previously determined predetermined time period, the value of the write counter and the value of the read counter of each of the page table entries 201 in the page table 200. Then, the time difference calculation unit 113 calculates, by using Numerical Expression 1, the reading/writing processing time difference of the time between a case in which writing and reading each of the pages in the predetermined time is performed in the DRAM 121 and a case in which the same process is performed in the nonvolatile memory 122. Furthermore, the time difference calculation unit 113 calculates, by using Numerical Expression 2, the log record overhead in the predetermined time in a case where each of the pieces of data is placed in the DRAM 121 (Step S201).

Then, the time difference calculation unit 113 subtracts the log record overhead from the calculated reading/writing processing time difference and calculates the time difference between a case in which each of the pages is placed in the DRAM 121 and a case in which each of the pages is placed in the nonvolatile memory 122 (Step S202). Then, the time difference calculation unit 113 outputs the calculated time difference of each of the pages to the page management unit 114.

The page management unit 114 receives an input of the time difference of each of the pages from the time difference calculation unit 113. Then, the page management unit 114 creates the DRAM list by arranging the identification information on each of the pages arranged in the DRAM 121 in descending order of the time differences (Step S203).

Then, the page management unit 114 creates the nonvolatile memory list by arranging the identification information on each of the pages arranged in the nonvolatile memory 122 in descending order of the time differences (Step S204).

Then, the page management unit 114 determines whether the time difference described on the last page of the DRAM list is equal to or less than zero (Step S205). If the time difference described on the last page of the DRAM list is equal to or less than zero (Yes at Step S205), the page management unit 114 moves the page described at the end of the DRAM list from the DRAM 121 to the nonvolatile memory 122 (Step S206).

Then, the page management unit 114 moves the identification information on the page described at the end of the DRAM list to the end of the nonvolatile memory list (Step S207). Then, the page management unit 114 returns to Step S205.

In contrast, if the time difference of the last page of the DRAM list is greater than zero (No at Step S205), the page management unit 114 determines whether the number of pages registered in the DRAM list is less than the maximum number of pages that can be arranged in the DRAM 121 (Step S208).

If the number of pages registered in the DRAM list is less than the maximum number of pages that can be arranged in the DRAM 121 (Yes at Step S208), the page management unit 114 determines whether the time difference of the top page of the nonvolatile memory list is greater than zero (Step S209). If the time difference of the top page of the nonvolatile memory list is equal to or less than zero (No at Step S209), the page management unit 114 ends the page move process.

In contrast, if the time difference of the top page of the nonvolatile memory list is greater than zero (Yes at Step S209), the page management unit 114 moves the top page of the nonvolatile memory list from the nonvolatile memory 122 to the DRAM 121 (Step S210).

In the following, the page management unit 114 moves the identification information described at the top of the nonvolatile memory list to the top of the DRAM list (Step S211). Then, the page management unit 114 returns to Step S208.

In contrast, if the number of pages registered in the DRAM list reaches the maximum number of pages that can be arranged in the DRAM 121 (No at Step S208), the page management unit 114 determines whether the time difference of the last page of the DRAM list is less than the time difference of the last page of the nonvolatile memory list (Step S212).

If the time difference of the last page of the DRAM list is less than the time difference of the top page of the nonvolatile memory list (Yes at Step S212), the page management unit 114 performs a swap process between the pages. Specifically, the page management unit 114 swaps the last page of the DRAM list stored in the DRAM 121 with the top page of the nonvolatile memory list stored in the nonvolatile memory 122 (Step S213).

Then, the page management unit 114 moves the identification information described at the top of the nonvolatile memory list to the top of the DRAM list (Step S214).

Then, the page management unit 114 moves the identification information described at the end of the DRAM list to the end of the nonvolatile memory list (Step S215). Then, the page management unit 114 returns to Step S212.

In contrast, if the time difference of the last page of the DRAM list is equal to or greater than the time difference of the top page of the nonvolatile memory list (No at Step S212), the page management unit 114 ends the page move process.

As described above, the information processing apparatus according to the embodiment determines which of the cases, i.e., a case in which a certain page is arranged in a DRAM and a case in which the certain page is arranged in a nonvolatile memory, reduces the overall processing time and then moves the subject page such that the overall processing time is reduced. More specifically, the information processing apparatus according to the embodiment calculates a reading/writing processing time difference that is a difference of the time needed to write and read a certain page to and from a DRAM and a nonvolatile memory in a predetermined time period between a case in which a certain page is arranged in a DRAM and a case in which the certain page is arranged in a nonvolatile memory. Furthermore, the information processing apparatus according to the embodiment calculates the log record overhead. Then, by using the reading/writing processing time difference and the log record overhead, the information processing apparatus according to the embodiment determines which of the cases, i.e., a case in which a certain page is arranged in the DRAM and a case in which the certain page is arranged in the nonvolatile memory, reduces the overall processing time.

Consequently, instead of simply arranging data that is frequently written to a storage device that processes at a high processing speed, it is possible to place data into storage devices each having a different processing speed so as to reduce the overall processing time by taking into consideration the log record overhead. In particular, in an application that guarantees the durability of data, such as a database, it is possible to place data such that the overall processing time is reduced. Consequently, the overall processing time of a system can be reduced and the performance can be improved.

In the embodiment described above, a case in which the nonvolatile memory is connected to the memory bus to which the volatile memory is connected has been described; however, the configuration is not limited to this. For example, even with the configuration in which the nonvolatile memory connected to a bus that is different from the memory bus to which the volatile memory is connected, it is possible to improve the performance of the system by providing the same function as that described in the embodiment.

According to an aspect of an embodiment, the present invention can improve the performance of the system.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. An information processing apparatus comprising:
a first storage device;
a second storage device in which the processing speed is lower than that of the first storage device;
a third storage device in which the processing speed is lower than that of the second storage device;
an execution processor that executes, in response to a write instruction, a first writing process of writing write data to the first storage device and storing a write history of the write data in the third storage device or a second writing process of writing the write data to the second storage device; and
a data management processor that moves predetermined data between the first storage device and the second storage device based on the number of times the predetermined data stored in the first storage device or the second storage device is written or read in a predetermined time period, based on the processing speed of each of the first storage device and the second storage device, and based on the time needed to store the write history in the third storage device executed by the execution processor.

2. The information processing apparatus according to claim 1, wherein the data management processor determines whether to move the predetermined data based on the time needed to write and read the predetermined data in the predetermined time period in the case where the predetermined data is stored in the first storage device, based on the time needed to write and read the predetermined data in the predetermined time period in the case where the predetermined data is stored in the second storage device, and based on the time needed to store the write history in the third storage device in the case where the first writing process is executed on the predetermined data by the execution processor in the predetermined time period.

3. The information processing apparatus according to claim 1, wherein the data management device moves the predetermined data to either the first storage device or the second storage device in which the total time needed to read and write the predetermined data in the predetermined time period is shorter in the case where the predetermined data is stored.

4. A non-transitory computer-readable recording medium having stored therein an information processing program that causes an information processing apparatus including a first storage device, a second storage device in which the processing speed is lower than that of the first storage device, and a third storage device in which the processing speed is lower than that of the second storage device to operate and that causes a computer to execute a process comprising:
executing, in response to a write instruction, a first writing process of writing write data to the first storage device and storing a write history of the write data in the third storage device or a second writing process of writing the write data to the second storage device; and
moving predetermined data between the first storage device and the second storage device based on the number of times the predetermined data stored in the first storage device or the second storage device is written or read in a predetermined time period, based on the processing speed of each of the first storage device and the second storage device, and based on the time needed to store the write history in the third storage device.

5. An information processing method performed in an information processing apparatus that includes a first storage device, a second storage device in which the processing speed is lower than that of the first storage device, and a third storage device in which the processing speed is lower than that of the second storage device, the information processing method comprising:
executing, in response to a write instruction, a first writing process of writing write data to the first storage device and storing a write history of the write data in the third storage device or a second writing process of writing the write data to the second storage device; and
moving predetermined data between the first storage device and the second storage device based on the number of times the predetermined data stored in the first storage device or the second storage device is written or read in a predetermined time period, based on the processing speed of each of the first storage device and the second storage device, and based on the time needed to store the write history in the third storage device.

* * * * *